US00RE43054E

(19) United States
(12) Reissued Patent
Bailey

(10) Patent Number: US RE43,054 E
(45) Date of Reissued Patent: Jan. 3, 2012

(54) METHOD AND APPARATUS FOR CASING EXIT SYSTEM USING COILED TUBING

(75) Inventor: Thomas F. Bailey, Houston, TX (US)

(73) Assignee: Weatherford/Lamb, Inc., Houston, TX (US)

(21) Appl. No.: 10/950,223

(22) Filed: Sep. 24, 2004

Related U.S. Patent Documents

Reissue of:
(64) Patent No.: 6,454,007
Issued: Sep. 24, 2002
Appl. No.: 09/608,196
Filed: Jun. 30, 2000

(51) Int. Cl.
*E21B 4/02* (2006.01)
*E21B 7/08* (2006.01)
*E21B 29/06* (2006.01)

(52) U.S. Cl. ..... 166/298; 166/55; 166/117.6; 166/313; 175/107

(58) Field of Classification Search ..... 166/298, 166/55, 117.6, 313, 50, 297, 386, 387, 298.55; 175/82, 107
See application file for complete search history.

(56) References Cited

U.S. PATENT DOCUMENTS 3,463,252 A * 8/1969 Garrett et al. ..... 175/27
3,896,667 A * 7/1975 Jeter ..... 73/152.46
3,908,759 A * 9/1975 Cagle et al. ..... 166/117.6
4,187,918 A * 2/1980 Clark ..... 175/39
4,427,079 A 1/1984 Walter
4,705,117 A 11/1987 Warren et al.
5,154,231 A * 10/1992 Bailey et al. ..... 166/298
5,186,265 A 2/1993 Henson et al.
5,277,251 A * 1/1994 Blount et al. ..... 166/117.5
5,287,921 A 2/1994 Blount et al.
5,363,929 A 11/1994 Williams et al.
5,431,219 A * 7/1995 Leising et al. ..... 166/50
5,443,129 A 8/1995 Bailey et al.
5,472,057 A 12/1995 Winfree
5,488,989 A 2/1996 Leising et al.
5,535,835 A 7/1996 Walker
5,647,436 A * 7/1997 Braddick ..... 166/298
5,709,265 A * 1/1998 Haugen et al. ..... 166/55.2
5,725,060 A * 3/1998 Blount et al. ..... 175/61
5,775,444 A 7/1998 Falgout, Sr.

(Continued)

FOREIGN PATENT DOCUMENTS

EP 0 685 628 12/1995

(Continued)

OTHER PUBLICATIONS

Canadian Office Action, Canadian Application No. 2409062, dated Apr. 18, 2005.

(Continued)

*Primary Examiner* — Daniel P Stephenson
(74) *Attorney, Agent, or Firm* — Patterson & Sheridan, L.L.P.

(57) ABSTRACT

A system and method for setting an anchor and/or whipstock attached to a downhole motor having a cutting tool attached to a tubular member, such as coiled tubing. In one aspect, the motor allows flow therethrough sufficient to actuate an upstream MWD or other position measuring tool, and an orienter if so equipped, and retain the orientation of the motor with the attached whipstock. An increased flow rate or pressure actuates the motor once the whipstock is set and rotation of the cutting tool or other equipment can begin.

39 Claims, 6 Drawing Sheets

U.S. PATENT DOCUMENTS

| | | | | | |
|---|---|---|---|---|---|
| 5,787,978 | A | * | 8/1998 | Carter et al. | 166/117.6 |
| 5,826,651 | A | * | 10/1998 | Lee et al. | 166/117.6 |
| 5,887,655 | A | * | 3/1999 | Haugen et al. | 166/298 |
| 5,911,275 | A | | 6/1999 | McGarian et al. | |
| 5,944,101 | A | * | 8/1999 | Hearn | 166/117.5 |
| 5,947,201 | A | * | 9/1999 | Ross et al. | 166/298 |
| 6,176,327 | B1 | * | 1/2001 | Hearn | 175/61 |
| 6,454,007 | B1 | * | 9/2002 | Bailey | 166/298 |
| 6,659,203 | B1 | * | 12/2003 | Cruickshank et al. | 175/107 |
| 6,945,328 | B2 | * | 9/2005 | Cruickshank et al. | 166/298 |
| 2002/0162659 | A1 | * | 11/2002 | Davis et al. | 166/298 |
| 2004/0089478 | A1 | * | 5/2004 | Cruickshank et al. | 175/61 |
| 2004/0089480 | A1 | * | 5/2004 | Dewey | 175/107 |

FOREIGN PATENT DOCUMENTS

| | | | |
|---|---|---|---|
| EP | 0 774 563 | | 5/1997 |
| EP | 0774563 | * | 5/1997 |
| FR | 2332412 | | 6/1977 |
| GB | 2 326 898 | | 1/1999 |
| GB | 2326898 | * | 1/1999 |

OTHER PUBLICATIONS

EP Office Action, Application No. 01 940 834.3-2315, dated Jun. 7, 2005.

PCT International Search Report from PCT/GB 01/02791, Dated Nov. 6, 2001.

* cited by examiner

METHOD AND APPARATUS FOR CASING EXIT SYSTEM USING COILED TUBING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to oil field tools. More specifically, the invention relates to an apparatus for and a method of using a motor in a tubular member disposed in a wellbore.

2. Background of the Related Art

Historically, oil field wells are drilled as a vertical shaft to a subterranean producing zone forming a wellbore, the wellbore is lined with a steel tubular casing, and the casing is perforated to allow production fluid to flow into the casing and up to the surface of the well. In recent years, oil field technology has increasingly used sidetracking or directional drilling to further exploit the resources of productive regions. In sidetracking, an exit, such as a slot or window, is cut in a steel cased wellbore typically using a mill, where drilling is continued through the exit at angles to the vertical wellbore. In directional drilling, a wellbore is cut in strata at an angle to the vertical shaft typically using a drill bit. The mill and the drill bit are rotary cutting tools having cutting blades or surfaces typically disposed about the tool periphery and in some models on the tool end.

Generally, components including an anchor, a whipstock coupled to the anchor and a rotary cutting tool that progresses downward along the whipstock are used to cut the angled exit through the casing in the wellbore. The whipstock is an elongated cylindrical wedge-shaped member having an inclined concave deflection surface and guides the angle of the rotary cutting tool progressively outward to cut the exit. One or more of the components are attached to a tubing member, such as drill pipe or coiled tubing, that is used to lower the components into the wellbore. The anchor typically is a bridge plug, packer or another supporting or sealing member. The anchor is set in a downhole position and extends across the wellbore to form an abutting surface for placement of subsequent equipment. The anchor can be secured in the wellbore by mechanical or hydraulic actuation of a set of jaws directed outward toward the casing or wellbore. Hydraulic actuation generally requires a fluid source from the surface that pressurizes a cavity in the anchor to actuate the jaws.

Three "trips" have been used in past times to cut the exit in the casing, using an anchor, a whipstock and a cutting tool. A trip generally includes lowering a tubular member with a cutting tool or other component into the wellbore, performing the intended operation, and then retrieving the members to the surface. The first trip sets the anchor in the wellbore, the second trip sets the whipstock to the anchor and the third trip actuates the cutting tool to cut the exit along the whipstock. Such operations are time consuming and expensive.

Others in the field have realized the need to reduce the number of trips. An example of a mechanically set anchor with reduced trips is described in U.S. Pat. No. 3,908,759. A first trip mechanically sets a bridge plug having a latching member. In a second trip, the whipstock, attached to an end of a cutting mill, is engaged with the latching member, the connection to the mill is sheared, and the mill can begin cutting along the whipstock. The reference does not discuss how orientation is determined to properly set the whipstock in position in the two trips.

An example of a hydraulic anchor, a whipstock and a cutting tool assembly that is set in a single trip is described in U.S. Pat. No. 5,154,231. The anchor and whipstock are set under hydraulic pressure and held by mechanical interlocks. Rotation of the cutting tool shears the connection from the whipstock and the cutting tool can begin to cut the exit. However, the reference does not state how the angular orientation of the whipstock is achieved in the single trip.

Angular orientation of the whipstock in the wellbore is important to properly direct the drilling or cutting. Most methods of orientation and initiation of cutting require multiple trips. Some systems allow orienting and setting of the whipstock in a single trip of a drill string in combination with a wireline survey instrument. For example, a known system includes an anchor, a whipstock and a cutter connected to a drill string. A wireline survey instrument is inserted through the drill string to determine proper orientation prior to setting the whipstock. However, it is frequently necessary to circulate drilling fluid through the drill string at a low flow rate in order to push the wireline tool from the surface down to the region of the whipstock. The flow can prematurely set the anchor, unless some device such as a selectively actuated bypass valve is used to divert the flow. Further, such methods require the separate use of the wireline survey instrument.

In contrast to the use of wireline survey instruments, the oil field industry is increasingly using in-situ systems that are capable of collecting and transmitting data from a position near the cutting tool while the cutting tool is operating. Such position measuring tools are known as measuring-while-drilling (MWD) tools and are generally situated at the lower end of the drill string above the cutting tool. The MWD tools typically transmit signals up to surface transducers and associated equipment that interpret the signals.

However, using an MWD tool in an assembly with a hydraulic anchor has challenges. Typical MWD tools require drilling fluid flow rates even greater than the flow rate required to push the wireline survey instrument downhole and increases the likelihood of inadvertently setting the anchor. Thus, an increased flow rate bypass valve can be used as described in U.S. Pat. No. 5,443,129. However, the system is suitable for a typical drill string that is rotated by a conventional drilling apparatus on a surface derrick. The disclosure does not address the current trends of using more flexible coiled tubing requiring a downhole motor to rotate the cutting tool without substantially rotating the coiled tubing.

Coiled tubing is increasingly being used to lower the costs of drilling and producing a well. Coiled tubing is a continuous line of tubing typically wound on a reel on a mobile surface unit that can be inserted downhole without having to assemble and disassemble numerous threaded joints of a drill string. However, the coiled tubing is not sufficiently rigid to accommodate rotational torque from the surface of the well along the tubing length to rotate the cutting tool in contrast to systems using drill pipe. Thus, typically, a downhole motor is mounted on the coiled tubing to rotate a cutting tool. Drilling fluid flowed through the interior of the coiled tubing is used to actuate the motor to rotate the cutting tool or other members.

A typical motor attached to the coil tubing is a progressive cavity motor. FIG. 1 is a schematic cross sectional view of a power section 1 of such a progressive cavity motor. FIG. 1A is a schematic cross sectional view of the downhole motor shown in FIG. 1. Similar elements are similarly numbered and the figures will be described in conjunction with each other. The power section 1 includes an outer stator 2, an inner rotor 4 disposed within the stator. An elastomeric member 7 is formed between the stator and rotor and is typically a part of the stator. The rotor 4 includes a plurality of lobes 6 formed in a helical pattern around the circumference of the rotor. The stator includes a plurality of receiving surfaces 8 formed in the elastomeric member for the lobes 6. The number of receiving surfaces is typically one more than the number of lobes. The lobes 6 are produced with matching lobe profiles and a similar helical pitch compared to the receiving surfaces in the stator. Thus, the rotor can be matched to and inserted within the stator. Fluid flowing from the inlet 3 through the motor creates hydraulic pressure that causes the rotor 4 to rotate within the stator 2, as well as precess around the circumference of the receiving surfaces 8. Thus, a progressive cavity 9 is created that progresses from the inlet 3 to the outlet 5 as the rotor is rotated within the stator 2. Fluid contained within the cavity is thereby exhausted through the outlet 5. The hydraulic pressure, causing the rotor to rotate, provides output torque for various tools attached to the motor.

It is desirable to orient an anchor and a whipstock with a cutting tool, a downhole motor, an MWD tool and a downhole orienter coupled to coiled tubing, then set the anchor and whipstock and begin cutting an exit in a minimum number of trips. However, fluid flowed through coiled tubing to operate the MWD would also typically actuate the motor. Thus, the rotating motor would be changing the orientation of the downhole anchor and whipstock indicated by the MWD, making orientation difficult at best.

There remains a need for a system and method for orienting and setting an anchor and/or whipstock using coiled tubing with a cutting tool and a downhole motor coupled thereto.

SUMMARY OF THE INVENTION

The present invention provides a system and method for orienting setting an anchor, a whipstock, a cutting tool and a downhole motor coupled to a tubular member, such as coiled tubing. In one aspect, the motor allows flow therethrough sufficient to actuate an MWD or other position measuring tool, and an orienter if so equipped, and substantially retains the orientation of the motor with the coupled whipstock. An increased flow rate or pressure actuates the motor once the whipstock is set and rotation of the cutting tool or other equipment can begin.

In one aspect, the invention provides a method of cutting a hole at an angle to a wellbore, comprising coupling a plurality of components including a position measuring tool, a downhole motor, a cutting tool, a whipstock and an anchor to a tubular member, orienting the whipstock to a desired orientation, and actuating the anchor. In another aspect, the invention provides a system for cutting a hole at an angle to a wellbore, comprising a tubular member, and a plurality of components having a position measuring tool, a downhole motor, a cutting tool, a whipstock and an anchor coupled to the tubular member. In a further aspect, the invention provides an apparatus for use in a wellbore, comprising a motor body, a motor shaft disposed at least partially internal to the motor body, and a fluid channel in communication with the motor shaft, the motor shaft being selectively nonrotational relative to the motor body while fluid flows through the motor at a first fluid flow rate and rotational while the fluid flows at a second fluid flow rate. In a further aspect, the invention provides a method of cutting a hole at an angle to a wellbore, comprising coupling an anchor to a coiled tubing, actuating the anchor in the wellbore, coupling a position measuring tool, a downhole motor and a cutting tool to a coiled tubing, orienting the whipstock to a desired orientation, and actuating the motor to turn the cutting tool. In another aspect, the invention provides a system for cutting a hole at an angle to a wellbore, comprising a coiled tubing, an anchor coupled to the coiled tubing at a first time, and a position measuring tool, a downhole motor, a cutting tool and a whipstock coupled to the coiled tubing at a second time.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 2:
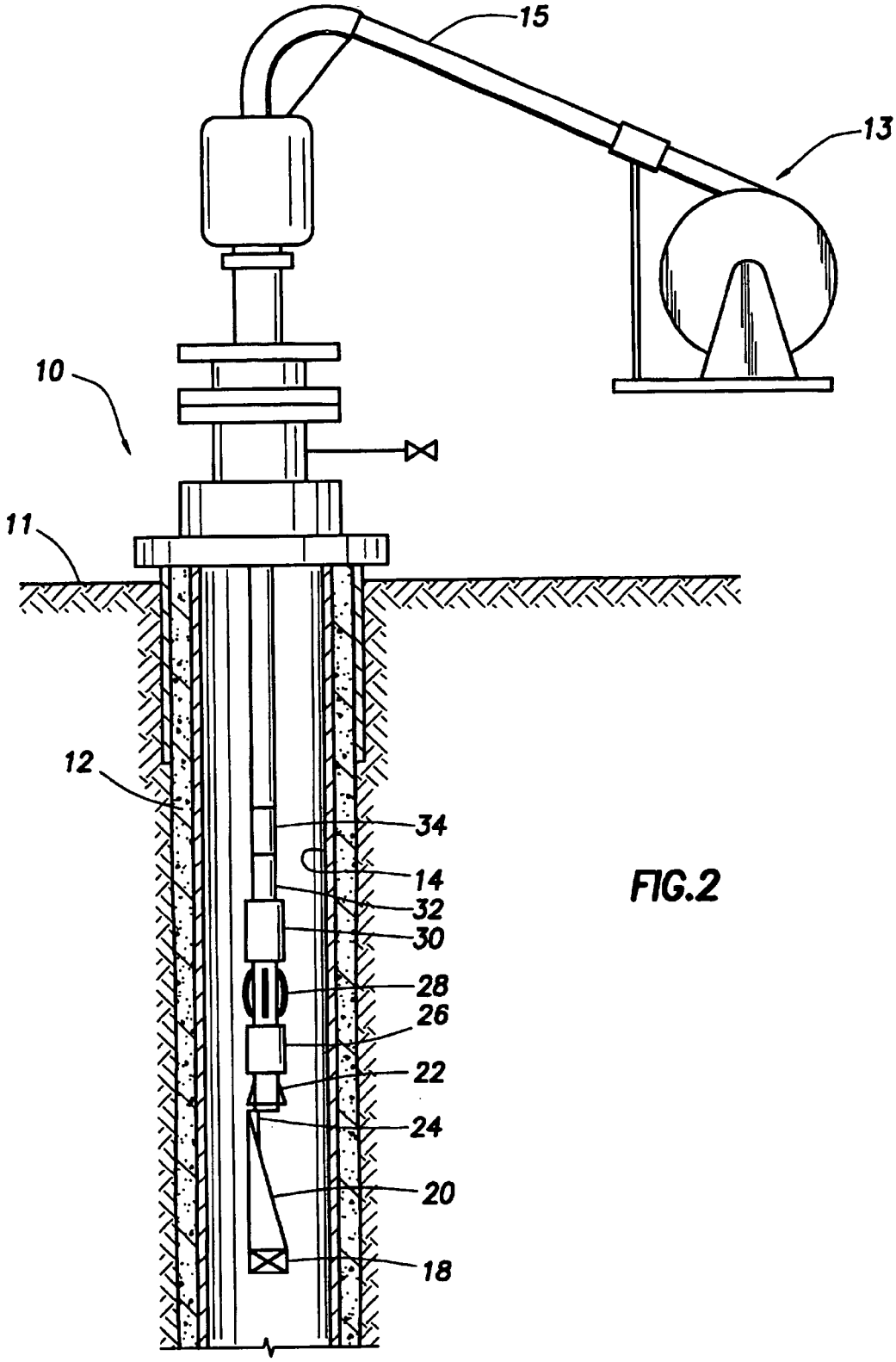
FIG. 2 is a schematic cross sectional view of a coiled tubing inserted into the wellbore.

FIG. 2 is a schematic cross sectional view of a tubing member inserted into the wellbore. The well is drilled through a surface 11 to establish a wellbore 10. Typically, the wellbore is cased with a casing 14. A space 12 between the drilled wellbore and the casing 14 is sealed with a solidifying aggregate such as concrete. A reel 13 is disposed adjacent the wellbore 10 and contains a quantity of tubing, such as coiled tubing 15. The coiled tubing 15 typically does not rotate to a significant degree within the wellbore. The reel 13 of coiled tubing provides an amount of tubing that can be relatively rapidly inserted in and removed from the wellbore 10 compared to drill pipe or tubing which must be assembled and reassembled in sections. Various components can be coupled to the coiled tubing 15 as described below beginning at the lower end of the arrangement. An anchor 18, such as a bridge plug, packer, or other setting device, is attached to the tubing generally on a lower end of the arrangement. A whipstock 20 is attached to the anchor 18 and includes an elongated tapered surface that guides the cutter 22, such as an end mill, outwardly toward casing 14. A cutting tool 22 is attached to the whipstock with a connection member 24. A connection member 24 can be a piece of metal that is later sheared downhole as the cutting tool is actuated. A spacer mill 26 can then be coupled to the cutting tool 22. The spacer mill 26 typically is a mill used to further define the hole or exit created by the cutting tool 22. In other embodiments, other types of cutters can be coupled, such as hybrid bits that are capable of milling an exit and continuing to drill into the formation. An exemplary hybrid bit is disclosed in U.S. Pat. Ser. No. 5,887,668 and is incorporated by reference herein. In some arrangements, a stabilizer sub 28 is attached to the coiled tubing 15. The stabilizer sub 28 has extensions protruding from the exterior surface to assist in concentrically retaining the tubing member and components in the wellbore 10. A motor 30 can be attached to the arrangement of components above the cutters. The motor 30 is used to rotate the cutters while the coiled tubing remains relatively rotationally stable. Preferably, the motor 30 allows a quantity of fluid to flow through the motor without rotation of the motor at a first time and then allows a second quantity and/or pressure of fluid to flow through the motor at a second time to rotate the cutters. A position measuring member 32, such as an MWD tool, is coupled above the motor 30. The position measuring member 32 requires a certain level of flow typically, 80-100 gallons per minute to actuate and provide feedback to equipment located at the surface 11. An orienter 34 is coupled to the coiled tubing above the position measuring member 32. The orienter 34 is a device that enables incremental angular rotation of the components to orient the whipstock in a certain direction. An exemplary orienter is available from Weatherford International. Generally, the orienter 34 is actuated by starting circulation and stopping circulation of fluid flowing down the coiled tubing 15. Each pulse of fluid indexes the orienter, generally, about 15-30° depending upon the tool. Thus, the orienter 34 can rotate the arrangement containing the whipstock to a desired orientation within the wellbore, while the position measuring member 32 provides feedback to determine the orientation. Heretofore, utilizing an MWD tool with a motor on a coiled tubing while orienting the whipstock has not been available. The flow required to actuate the orienter 34 and position measuring member 32 would typically turn the motor 30 and change the orientation of whipstock 20. Thus, the accuracy of the alignment between the orienter and the whipstock would be changed and become unknown downhole.

It is to be understood that the arrangement in FIG. 2 is merely exemplary and, therefore, many arrangements are possible. For example, the anchor 18 may be separately coupled to the coiled tubing 15 and set in position in one trip. The other components such as the whipstock, mill, motor, orienter and position measuring member may then be inserted downhole in a second trip. In other embodiments, the anchor and the whipstock may be inserted in a first trip and the other components inserted in a second trip.

Figure 8:
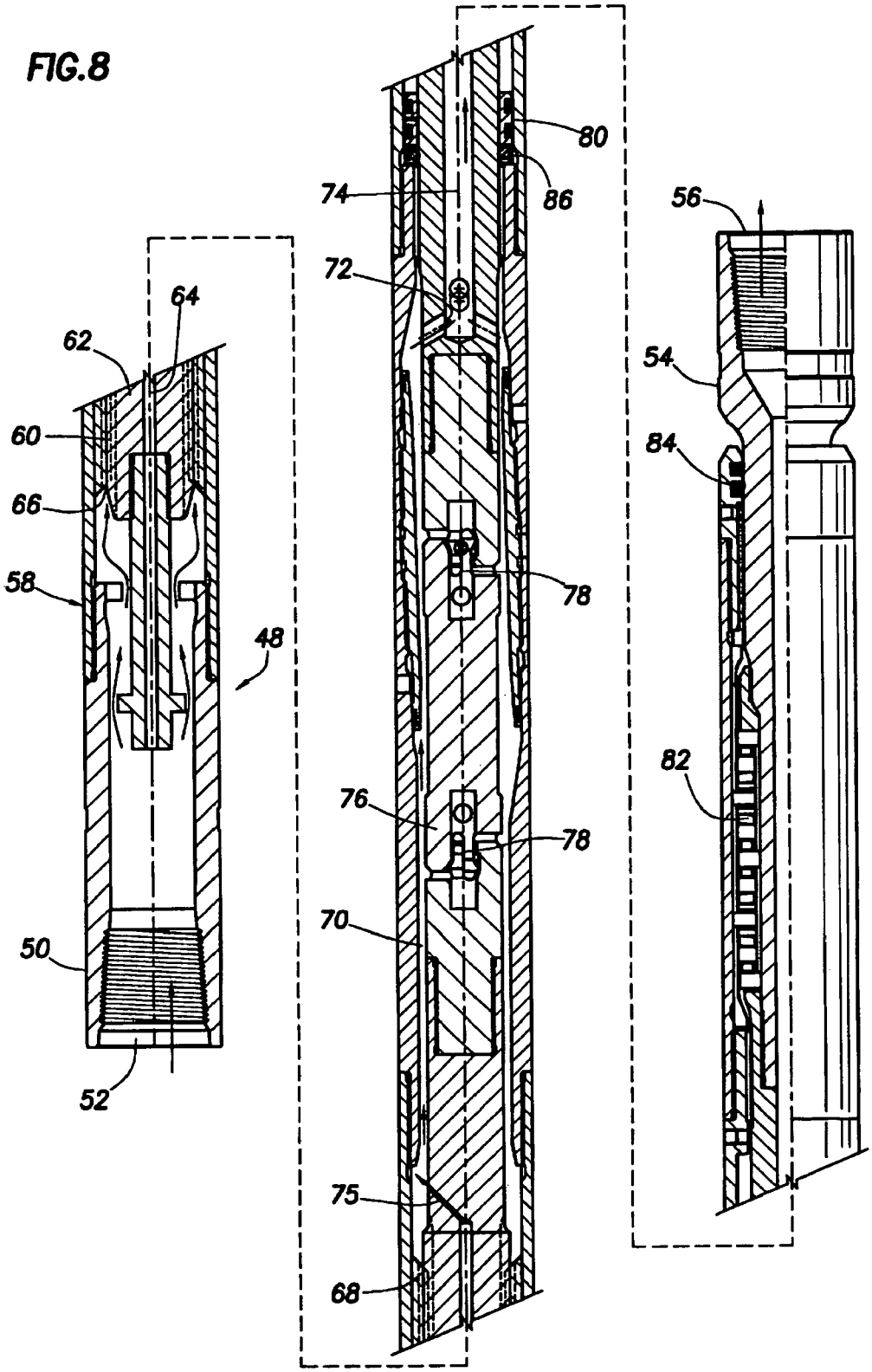
FIG. 8 is a schematic cross sectional view of a downhole motor.
Figure 9:
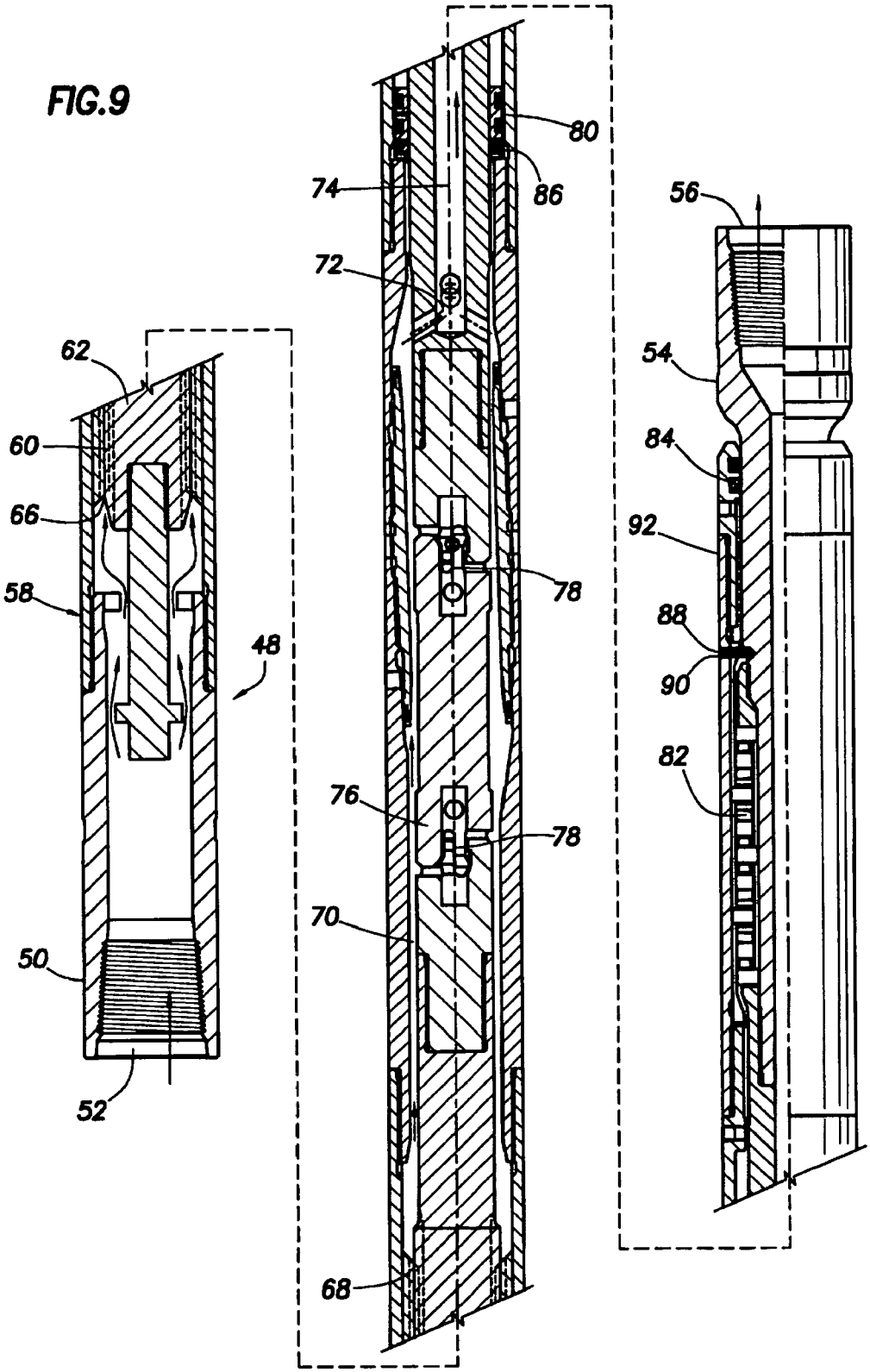
FIG. 9 is a schematic cross sectional view of an alternative embodiment of the downhole motor shown in FIG. 8.

The motor 30 allows flow without substantial rotation at a first flow rate and/or pressure to allow sufficient flow through the orienter 34 and the position measuring member 32 without actuation of the motor, as described in reference to FIGS. 8-9. The flow in the tubing member through the orienter, position measuring member and motor is then exhausted through ports in the end mill and flows outwardly and then upwardly through the wellbore 10 back to the surface 11. Flow through or around the motor 30 allows the reduction of at least one trip in setting the anchor 18 and starting to drill the exit in the wellbore 10.

Figure 5:
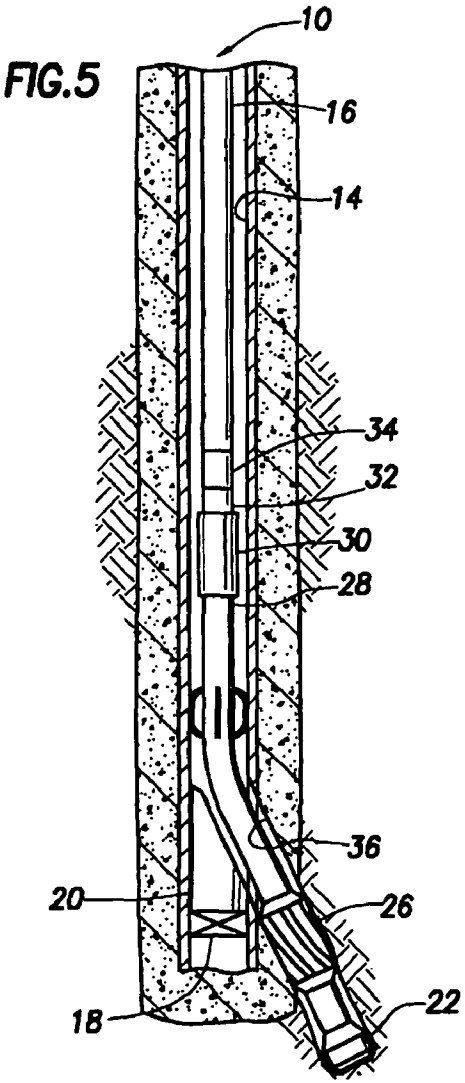
FIG. 5 is a schematic cross sectional view of a whipstock set in position and an end mill cutting an exit through the casing.
Figure 4:
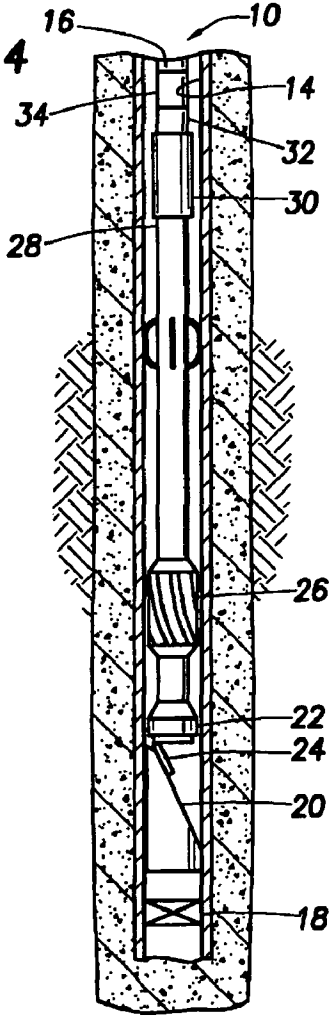
FIG. 4 is a schematic cross sectional view of other components coupled to a tubing member.
Figure 3:
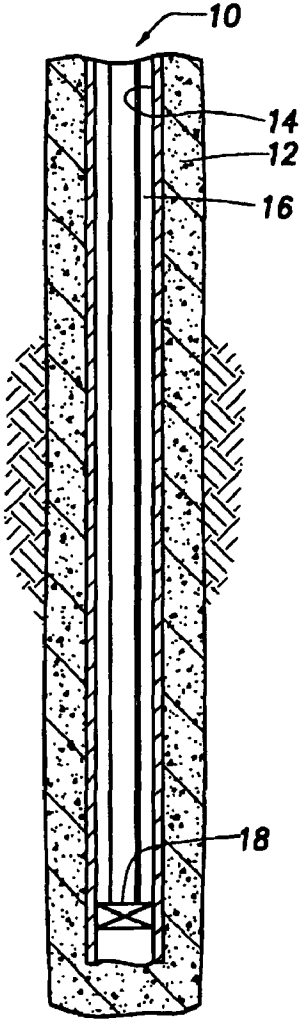
FIG. 3 is a schematic cross sectional view of an anchor inserted downhole in the wellbore.

FIGS. 3-5 are cross sectional views of a wellbore, showing a exemplary sequence in setting a mechanical anchor, orienting the whipstock, and beginning to cut an exit in two trips. Various components including an anchor 18, a whipstock 20, a cutting tool 22, a motor 30, a position measuring member 32 and an orienter 34 are coupled to the tubing member 16, such as coiled tubing.

FIG. 3 is a schematic cross sectional view of an anchor inserted downhole in the wellbore. A tubing member 16, such as coiled tubing, is inserted downhole through the wellbore 10 and inside the casing 14. An anchor 18, such as a mechanical anchor, is coupled to the lower end of the tubing member. The mechanical anchor 18 requires mechanical actuation to set the anchor in position, as known to those with ordinary skill in the art. After the anchor 18 is set, the anchor is released from the tubing member and the tubing member is retrieved back to the surface.

FIG. 4 is a schematic cross sectional view of various components coupled to the tubing member 16 after the anchor 18 is set. At a lower end of the arrangement, a whipstock is attached to a cutting tool 22 through a connection member 24. A spacer mill 26 is coupled to the cutting tool 22. A stabilizer sub 28 is coupled to the spacer mill 26 and a motor is coupled to the stabilizer sub. A position measuring member 32 is coupled to the motor 30 and an orienter 34 is coupled to the position measuring member. The orienter is also coupled to the tubing member 16. The term "coupled" as used herein includes at least two components directly coupled together or indirectly coupled together with intervening components coupled therebetween.

The tubing member 16 and the components coupled thereto are lowered downhole, so that the whipstock 20 is adjacent the anchor 18. Fluid flow through the tubing member 16 is used to actuate the orienter 34 and rotationally index the components below the orienter to a desired orientation. The position measuring member 32 provides feedback to the equipment located generally on the surface 11 (shown in FIG. 2) to determine the position of the whipstock 20 to an operator. The motor 30 allows sufficient flow through the orienter 34 and the position measuring member 32 to allow actuation thereof without rotating the motor 30 and the components attached therebelow. Thus, a relative alignment between the position measuring member, orienter, motor, mills, and whipstock is maintained. Once the whipstock is properly oriented, the tubing member 16 is further lowered, so that the whipstock 20 engages the anchor 18 and is set in position.

FIG. 5 is a schematic cross sectional of the whipstock 20 set in position and the cutting tool 22 cutting an exit through the casing 14 at an angle to the wellbore 10. As the flow rate and/or pressure of fluid within the tubing member 16 increases, the motor 30 is actuated and turns the cutting tool 22. Sufficient torque created by the motor 30 shears the connection member 24 between the whipstock 20 and the cutting tool 22. The cutting tool 22 begins to turn and is guided at an angle to the wellbore 10 by the whipstock 20. As the tubing member 16 is further lowered downhole, the cutting tool 22 cuts at an angle through the casing 10 and creates an angled exit therethrough. In some embodiments, the casing 14 may not be placed in a wellbore 10. It is to be understood that the arrangements described herein for cutting an angled exit apply regardless of whether the casing 14 is placed in the wellbore.

The orienter 34 is designed to be rotationally stable during the operation of the motor 30 because the pressure is not pulsed from a low to high pressure that otherwise actuates the orienter. However, if the orienter 34 is actuated and does index, the change of the orienter does not effect the ability of the motor 30 to operate the cutting tool 22 nor the direction of the end mill because the end mill is guided by the whipstock 20.

Figure 6:
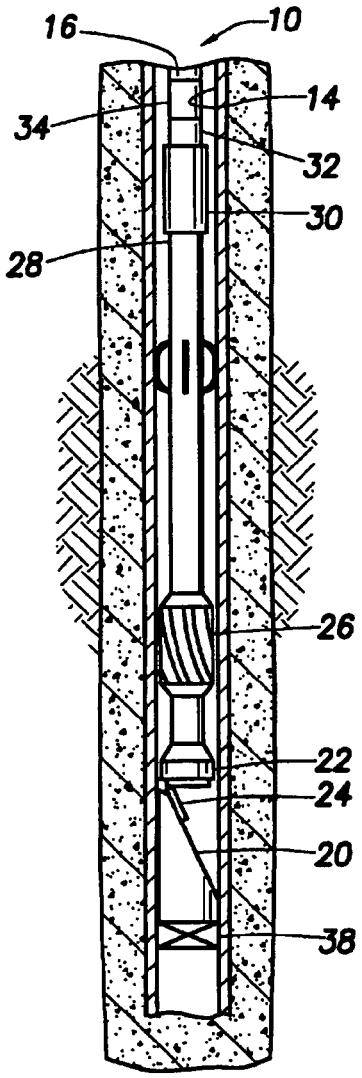
FIG. 6 is a schematic cross sectional view of an arrangement of components using a hydraulic anchor 38.

FIG. 6 is a schematic cross sectional view of an arrangement of components using a hydraulic anchor 38. FIG. 6 shows the arrangement being inserted downhole in the wellbore and includes a hydraulic actuator 38 coupled to a corresponding set of components described in reference to FIGS. 2-5. The components include, for example, an anchor 20 and a cutting tool 22 coupled to the anchor 20 with a connection member 24. Further, the arrangement includes a spacer mill 26, a stabilizer sub 28, a motor 30, a position measuring member 32 and an orienter 34 coupled to a tubing member 16. A hydraulic anchor 38 can be actuated remotely and thus does not require a separate trip, as described in reference to FIG. 3. Therefore, the arrangement shown in FIG. 6 can be used to set the anchor and the whipstock and begin cutting an exit in wellbore in a single trip. The arrangement is lowered downhole to an appropriate position. The whipstock 20 is oriented using the orienter 34 to a position determined by the position measuring member 32, while the motor 30 allows flow therethrough without substantial rotation of the motor. The hydraulic anchor 38 is set with a hydraulic fluid flowing through a tube (not shown).

Figure 7:
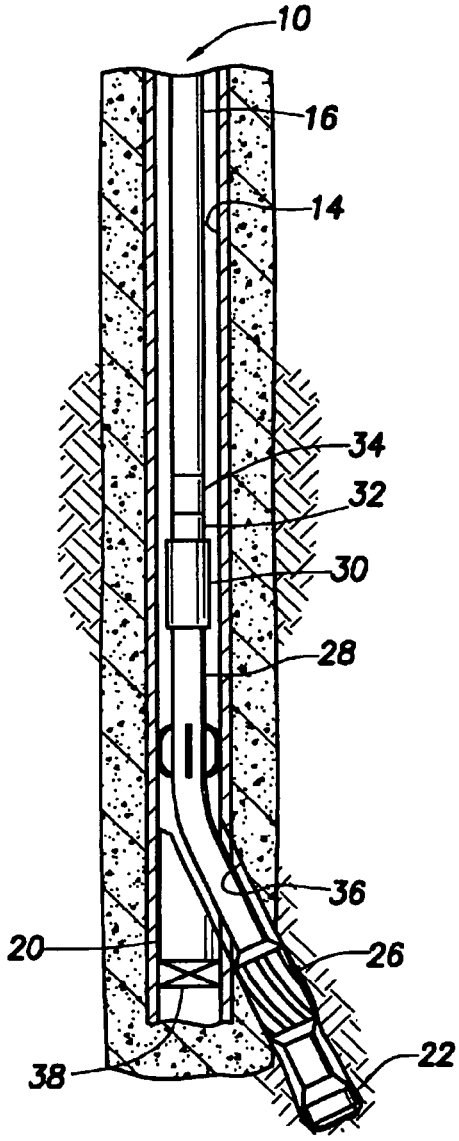
FIG. 7 is a schematic cross sectional view of the arrangement shown in FIG. 6 including a whipstock set in position and an end mill cutting an exit through the casing.

FIG. 7 is a schematic cross sectional view of the arrangement shown in FIG. 6. The hydraulic anchor 38 and whipstock 20 have been oriented and set in position. The motor 30 is actuated by increased flow rate and/or pressure and turns the cutting tool 22 and other members located below the motor 30. As the cutting tool 22 rotates and the tubing member 16 is lowered downhole, the cutting tool 22 is guided by the whipstock 20 and cuts an exit 36 through the wellbore 10. Thus, setting the anchor, orienting the whipstock, and cutting an exit can be performed in a single trip.

Figure 1:
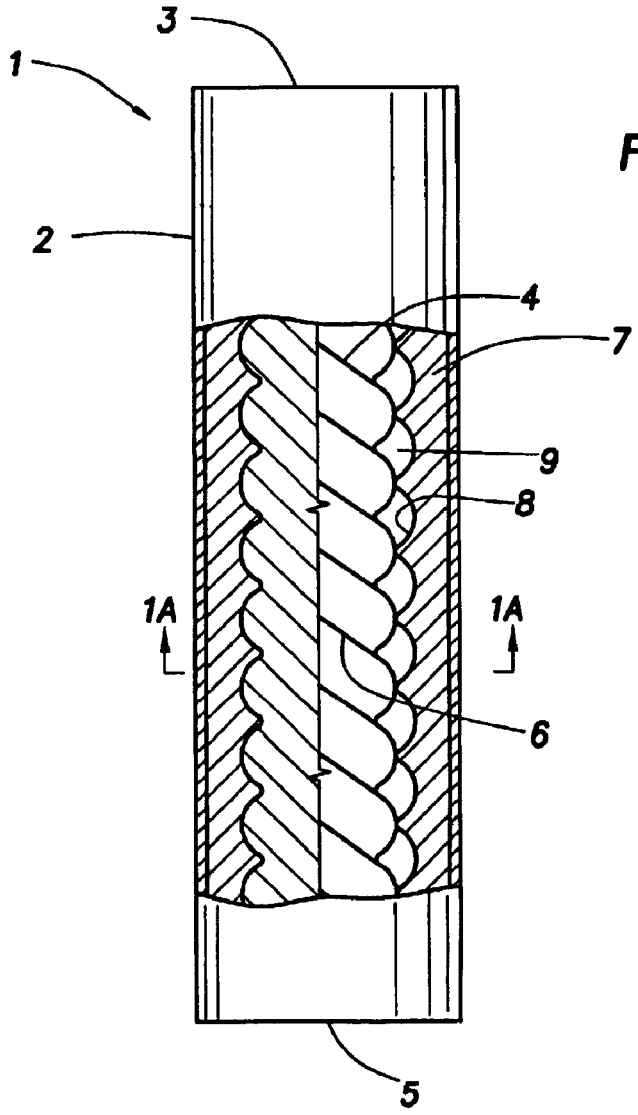
FIG. 1 is a schematic cross sectional view of a power section of a progressive cavity motor in the prior art.
Figure 1A:
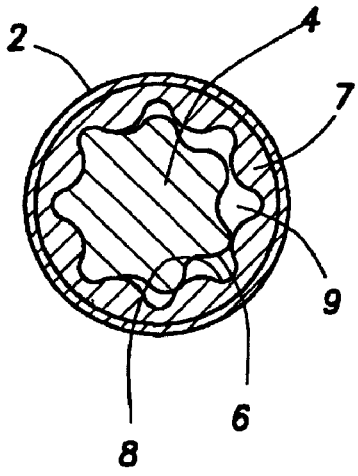
FIG. 1A is a schematic cross sectional view of the power section shown in FIG. 1.

One example a downhole motor that can be used as described herein is a modified progressive cavity motor. FIG. 8 is a schematic cross sectional view of such a motor. The progressive cavity motor 48 includes a top sub 50 having a fluid inlet 52, an output shaft 54 having a fluid outlet 56, and a power section 58 disposed therebetween. The power section includes a stator 60 circumferentially disposed about a rotor 62. The rotor 62 has a hollow cavity 64 disposed therethrough that is fluidicly coupled from the inlet 52 to the outlet 56. An inlet 66 of the power section portion of the motor 48 allows fluid to flow into a progressive cavity created between the stator 60 and the rotor 62 as the rotor rotates about the stator and to exit an outlet 68 of the power section, as described in reference to FIGS. 1 and 1A.

An annulus 70 downstream of the outlet 68 is created between the inner wall of the motor 48 and various components disposed therein, which provide a flow path for the fluid exiting the outlet 68. A transfer port 72 is fluidicly coupled from the annulus 70 to a hole 74 disposed in the output shaft 54 and then to the output 56. A restrictive port 75 can be formed between the hollow cavity 64 and the annulus 70 to fluidicly couple the hollow cavity 64 to the annulus 70.

Because the rotor precesses within the stator, an articulating shaft 76 can be disposed between the rotor 62 and the output shaft 54, so that the output shaft 54 can rotate circumferentially within the motor 48. The articulating shaft 76 can include one or more knuckle joints 78 that allow the stator to precess within the stator with the necessary degrees of freedom. A bearing 80 can be disposed on an upper end of an output shaft 54 and a lower bearing assembly 82 can be disposed on a lower end of an output shaft 54. One or more seals, such as seals 84, 86, assist in sealing fluid from leaking through various joints in the downhole motor 48.

In operation, fluid is flowed down the tubular member 16, shown in FIGS. 3-7 and enters inlet 52 of the top sub 50. At a relatively low flow rate, such as 10 gallons per minute, the flow rate and pressure are insufficient to rotate the rotor 62 within the stator 60 and the fluid stops at inlet 66. However, some fluid flows into the hollow cavity 64 in the rotor 62 and through port 75, into the annulus 70, and eventually through the output 56 of the output shaft 54. Thus, the fluid from the top of the motor is able to flow through the motor without substantially actuating the motor. The flow through the hollow cavity 64 allows various tools located upstream and downstream from the motor to receive flow for indexing, orientation or other functions, as has been described herein.

The flow rate and/or pressure can be increased to a level at which the rotor 62 rotates within the stator 60 and creates torque on the output shaft 54, so that the motor can rotate downstream tools, such as a cutting tool, as has been described herein. The flow through the hollow cavity 64 reaches a maximum rate for a given pressure. The flow through the inlet 66 and outlet 68 at greater flow rates and pressures overcome flow through the hollow cavity 64. Further, the motor can be activated and deactivated by adjusting the flows without having to retrieve and reset the motor.

FIG. 9 is a schematic cross sectional view of another embodiment of the downhole motor 48. Similar elements in FIG. 8 are similarly numbered in FIG. 9. A top sub 50 having an inlet 52 is coupled to a power section 58 having a stator 60 and rotor 62 that is disposed therein. Power section 58 is coupled to an output shaft 54 having an outlet 56. A flow path exist between the inlet 52 and an inlet 66 between the stator 60 and the rotor 62, an outlet 62, an annulus 70, a transfer port 72, and a hole 74 that is coupled to the outlet 56.

Generally, fluid is flowed through the inlet 52 at a flow rate and pressure that will force the rotor 62 to rotate within the stator 60. It is known that a percentage of the fluid, at a given pressure and flow rate, can leak through the cavities formed between the stator 60 and the rotor 62, but typically the rotor 62 begins to rotate before a substantial amount of fluid leaks therethrough. In the embodiment shown in FIG. 9, the rotation of the rotor is restrained by a shear pin 88. The shear pin 88 can be disposed in a hole 90 formed through an outer shell 92 of the motor 48 and into the output shaft 54. The shear pin can be located at other positions along the motor 48 and the position shown in FIG. 9 is merely exemplary. The shear pin restrains the output shaft from rotation and allows an increased flow between the progressive cavity formed between the stator 60 and the rotor 62 without the rotor substantially rotating. Thus, fluid can be flowed through the downhole motor 48 for activation of tools both upstream and downstream of the motor without the motor substantially rotating. The fluid flow rate and/or pressure can be increased to a level at which the torque created on the rotor 62 shears the shear pin 88 and allows the rotor to rotate the output shaft 54.

While the foregoing is directed to various embodiments of the present invention, other and further embodiments may be devised without departing from the basis scope thereof, and the scope thereof is determined by the claims that follow. For example, "up", "down" and variations thereof include not only a typical orientation of a vertical shaft for wellbore, but also includes a lateral shaft formed by directional drilling, such that "up" would be directed toward the beginning of the wellbore and "down" would be directed toward the lateral end of the wellbore. Furthermore, any flow rates described herein are exemplary and could vary depending on the well conditions, fluids used, size of tools and so forth. Further, variations in the progressive cavity motor can be made as well as the use of other types of motors that would allow fluid to flow through the motor, so that tools coupled upstream and downstream of the motor can be activated without the motor substantially rotating.

What is claimed is:

1. A method of cutting a hole at an angle to a wellbore, comprising;

a) coupling a position measuring tool, a downhole motor, a cutting tool, a whipstock and an anchor to a tubular member;

b) selectively maintaining the motor in a substantially unactuated condition while flowing a fluid through the motor sufficient to operate the position measuring tool; and c) actuating the anchor.

2. The method of claim 1, wherein actuating the anchor occurs without substantially changing an orientation of the whipstock.

3. The method of claim 1, further comprising measuring the orientation of the whipstock in-situ prior to actuating the anchor.

4. The method of claim 1, wherein the tubular member is coiled tubing.

5. The method of claim 1, further comprising lowering the position measuring tool, downhole motor, cutting tool, whipstock and anchor into the wellbore and wherein lowering into the wellbore, orienting the whipstock, and actuating the anchor occurs in a single trip.

6. The method of claim 1, further comprising lowering the anchor into the wellbore and actuating the anchor in position prior to lowering the position measuring tool, downhole motor, cutting tool and whipstock into the wellbore and orienting the whipstock.

7. The method of claim 1, wherein maintaining the motor includes flowing fluid through a hollow motor shaft of the motor.

8. The method of claim 7, wherein flowing the fluid through the hollow motor shaft comprises flowing at a first flow rate while orienting the whipstock and flowing at a second flow rate while actuating the motor to rotate the cutting tool.

9. The method of claim 1, wherein selectively maintaining the motor in a stationary rotational position comprises locking a motor shaft of the motor in rotational position.

10. The method of claim 9, further comprising creating sufficient torque on the motor shaft to unlock the motor shaft and rotate the cutting tool.

11. The method of claim 9, further comprising increasing a pressure of the fluid to unlock the motor shaft.

12. The method of claim 1, further comprising orienting the whipstock before actuating the anchor.

13. The method of claim 12, wherein orienting the whipstock comprises using an orienter to orient the whipstock.

14. The method of claim 13, wherein the position measuring tool is arranged between the orienter and the motor.

15. A system for cutting a hole at an angle to a wellbore, comprising:

a) a tubular member; and b) a plurality of components including a position measuring tool, a downhole motor, a cutting tool, a whipstock, and an anchor coupled to the tubular member, the motor comprising a motor shaft that is rotationally stationary relative to the whipstock while a fluid flows through the motor to operate one or more of the other components.

16. The system of claim 15, wherein the components further comprise an orienter coupled to the tubular member.

17. The system of claim 16, wherein the tubular member is a coiled tubing.

18. The system of claim 17, wherein the components are arranged in an order of the orienter, the motor, the cutting tool, and the whipstock.

19. The system of claim 18, wherein the position measuring tool is arranged between the orienter and the motor.

20. The system of claim 15, wherein the motor shaft comprises a hollow motor shaft.

21. The system of claim 20, wherein the hollow motor shaft is sized to allow the fluid to flow through the shaft at a first flow rate while maintaining the rotationally, stationary position and to allow the fluid to rotate the motor shaft at a second flow rate.

22. The system of claim 15, wherein the stationary motor shaft comprises a locked motor shaft while fluid flows through the motor at a first pressure and the whipstock is at least partially oriented.

23. The system of claim 22, further comprising a shear member to lock the motor shaft.

24. The system of claim 23 , wherein the shear member is sized to shear and unlock the motor shaft when the pressure of the fluid is increased to a second pressure.

25. A method of cutting a hole at an angle to a wellbore, comprising:

a) coupling an anchor to a coiled tubing;

b) actuating the anchor in the wellbore;

c) coupling a position measuring tool, a downhole motor, a whipstock, and a cutting tool to the coiled tubing;

d) selectively maintaining the motor in a substantially unactuated condition while flowing a fluid through the motor and at least partially orienting the whipstock;

e) orienting the whipstock to a desired orientation; and f) actuating the motor to turn the cutting tool to cut the hole.

26. The method of claim 25, wherein orienting the whipstock comprises using an orienter to orient the whipstock.

27. The method of claim 25, further comprising flowing fluid through a hollow motor shaft of the motor at a first flow rate while orienting the whipstock and flowing at a second flow rate while actuating the motor to rotate the cutting tool.

28. The method of claim 25, further comprising locking a motor shaft of the motor in a non-rotational position while flowing the fluid through the motor and while orienting the whipstock.

29. The method of claim 28, further comprising creating sufficient torque on the motor shaft to unlock the motor shaft and rotate the cutting tool.

30. An apparatus for use in a wellbore, comprising:

a) a tubular;

b) a motor body disposed in the tubular, the motor body having an axial channel extending through the motor body;

c) a motor shaft at least partially disposed in the axial channel, the motor shaft having a channel in fluid communication with the channel of the motor body; and d) an output shaft disposed below the motor shaft, wherein the motor shaft is substantially unactuated while a fluid flows through the motor body to actuate a downhole tool disposed below the motor body.

31. The apparatus of claim 30, further comprising a shear member disposed between the motor shaft and the motor body.

32. A system for cutting a hole at an angle to a wellbore, comprising:

a) a coiled tubing;

b) an anchor coupled to the coiled tubing; and c) a position measuring tool, a downhole motor, a cutting tool, and a whipstock coupled to the coiled tubing, the motor comprising:

1) a tubular;

2) a motor body disposed in the tubular; the motor body having an axial channel extending through the motor body;

3) a motor shaft at least partially disposed in the axial channel, the motor shaft having a channel in fluid communication with the channel of the motor body; and 4) an output shaft disposed below the motor shaft, wherein the motor remains substantially unactuated while a fluid flows through the motor body to actuate a downhole tool disposed below the motor.

33. The apparatus of claim 32, wherein the motor further comprises a shear member disposed between the motor shaft and the motor body.

*34. A system for cutting a wellbore, comprising:*

*a tubular member; and*

*a plurality of components including a position measuring tool, a downhole motor, a cutting tool, and a whipstock coupled to the tubular member, the motor comprising a motor shaft that is rotationally stationary relative to the whipstock while a fluid flows through the motor to operate one or more of the other components.*

*35. A method of operating a downhole tool, comprising:*

*coupling a downhole motor and the downhole tool to a tubular member;*

*selectively maintaining the downhole motor in a substantially unactuated condition while flowing a fluid through the downhole motor sufficient to operate the downhole tool; and*

*operating the downhole tool.*

*36. The method of claim 35, wherein the downhole tool is disposed downstream from the downhole motor.*

*37. The method of claim 35, further comprising increasing the fluid flow to actuate the downhole motor.*

*38. A method of operating a downhole tool, comprising:*

*coupling a downhole motor and the downhole tool to a tubular member;*

*supplying a fluid at a first flow rate through the tubular member and the downhole motor to operate the downhole tool while selectively maintaining the motor in a substantially unactuated condition; and*

*supplying the fluid at a second flow rate to operate the downhole motor.*

*39. A system for cutting a hole at an angle to a wellbore, comprising:*

*a coiled tubing;*

*an anchor coupled to the coiled tubing; and*

*a position measuring tool, a downhole motor, and a cutting tool coupled to the coiled tubing, the motor comprising:*

*a tubular;*

*a motor body disposed in the tubular; the motor body having an axial channel extending through the motor body;*

*a motor shaft at least partially disposed in the axial channel, the motor shaft having a channel in fluid communication with the channel of the motor body; and*

*an output shaft disposed below the motor shaft, wherein the motor remains substantially unactuated while a fluid flows through the motor body to actuate a downhole tool disposed below the motor.*

* * * * *